US008718324B2

(12) United States Patent
Fan

(10) Patent No.: US 8,718,324 B2
(45) Date of Patent: May 6, 2014

(54) METHOD, APPARATUS AND COMPUTER PROGRAM PRODUCT FOR PROVIDING OBJECT TRACKING USING TEMPLATE SWITCHING AND FEATURE ADAPTATION

(75) Inventor: Lixin Fan, Tampere (FI)

(73) Assignee: Nokia Corporation, Espoo (FI)

( * ) Notice: Subject to any disclaimer, the term of this patent is extended or adjusted under 35 U.S.C. 154(b) by 79 days.

(21) Appl. No.: 13/161,428

(22) Filed: Jun. 15, 2011

(65) Prior Publication Data

US 2011/0311100 A1 Dec. 22, 2011

Related U.S. Application Data

(60) Provisional application No. 61/357,315, filed on Jun. 22, 2010.

(51) Int. Cl.
*G06K 9/00* (2006.01)
*H04N 5/225* (2006.01)

(52) U.S. Cl.
USPC ........................................ 382/103; 348/169

(58) Field of Classification Search
USPC .......... 382/103, 107, 236; 348/169, 170, 171, 348/172, 208.1, 208.2, 208.14, 94, 154, 348/155, 352
See application file for complete search history.

(56) References Cited

U.S. PATENT DOCUMENTS

| 6,529,613 | B1 * | 3/2003 | Astle | 382/103 |
| 7,725,411 | B2 * | 5/2010 | Tian et al. | 706/20 |
| 7,742,077 | B2 * | 6/2010 | Sablak et al. | 348/208.99 |
| 2006/0209214 | A1 * | 9/2006 | Fader et al. | 348/584 |
| 2007/0009159 | A1 | 1/2007 | Fan | |
| 2009/0141936 | A1 * | 6/2009 | Abe | 382/103 |

OTHER PUBLICATIONS

International Search Report and Written Opinion, received in corresponding Patent Cooperation Treaty Application No. PCT/IB2011/052527, dated Nov. 11, 2011, 12 pages.
Wu, Ying, "Tracking Appearances with Occlusions", Proceedings of the IEEE Computer Society Conference on Computer Vision and Pattern Recognition, 2003, ISSN 1063-6919; whole document.
Matthews, Lain, "The Template Update Problem", IEEE Transactions on Pattern Analysis and Machine Intelligence, vol. 26, No. 6, Jun. 2004, ISSN 0162-8828; whole document.
Wang, Peng, "Robust Face Tracking via Collaboration of Generic and Specific Models", IEEE Transactions on Image Processing, vol. 17, No. 7, Jul. 2008, ISSN 1057-7149: whole document.

(Continued)

*Primary Examiner* — Abolfazl Tabatabai
(74) *Attorney, Agent, or Firm* — Alston & Bird LLP

(57) ABSTRACT

A method, apparatus and computer program product are provided that may enable devices to provide improved object tracking, such as in connection with computer vision, multimedia content analysis and retrieval, augmented reality, human computer interaction and region-based image processing. In this regard, a method includes adjusting parameters of a portion of an input frame having a target object to match a template size and then performing feature-based image registration between the portion of the input frame and an active template and at least one selected inactive template. The method may also enable switching the selected inactive template to be an active template for a subsequent frame based at least on a matching score between the portion of the input frame and the selected inactive template and determine a position of a target object in the input frame based on one of the active template or the selected inactive template.

17 Claims, 5 Drawing Sheets

(56) References Cited

OTHER PUBLICATIONS

Avidan, S.; "*Ensemble Tracking*;" IEEE Transactions of Pattern Analysis and Machine Intelligence; dated 2007; retrieved on Nov. 14, 2013 from <http://www.cmlab.csie.ntu.edu.tw/~cyy/learning/papers/ADB_EnsembleTracking.pdf>.
Babenko, B., et al.; "*Visual Tracking with Online Multiple Instance Learning*;" CVPR; dated 2009; retrieved on Nov. 15, 2013 from <http://vision.ucsd.edu/~bbabenko/data/miltrack_cvpr09.pdf>.
Bay, H. et al.; "*SURF: Speeded Up Robust Features*;" Proceedings of the ninth European Conference on Computer Vision; dated 2006; retrieved on Nov. 15, 2013 from <http://www.vision.ee.ethz.ch/~surf/eccv06.pdf>.
Burkard, R., et al.; "*Assignment Problems*;" Society for Industrial and Applied Mathematics; dated 2009; abstract retrieved on Nov. 15, 2013 from <http://books.google.com/books/about/Assignment_Problems.html?id=nHIzbApLOr0C>.
Chandrasekhar, C., et al.; "*CHoG: Compressed Histogram of Gradients, a Low Bitrate Descriptor*;" dated 2009; retrieved on Nov. 14, 2013 from <http://www.stanford.edu/~bgirod/pdfs/Chandrasekhar_CVPR2009.pdf>.
Collins, R. T., et al.; "*Online Selection of Discriminative Tracking Feature*;" IEEE Transactions on Pattern Analysis and Machine Intelligence, vol. 27, No. 10; pp. 1631-1643; dated Oct. 2005; retrieved on Nov. 14, 2013 from <http://109.101.234.42/documente/publications/11-24.pdf>.
Ellis, L., et al.; "*Linear predictors for fast simultaneous modeling and tracking*;" ICCV Workshop on Non-rigid Registration and Tracking through Learning; dated 2007; retrieved on Nov. 14, 2013 from <http://personal.ee.surrey.ac.uk/Personal/R.Bowden/publications/2007/ellis-nrtl-2007.pdf>.
Fan, L.; "*What a Single Template Can Do in Recognition*;" 4$^{th}$ International Conference on Image and Graphics; pp. 586-591; dated 2004; abstract retrieved on Nov. 15, 2013 from <http://ieeexplore.ieee.org/xpl/freeabs_all.jsp?arnumber=4297152&abstractAccess=no&userType=inst>.
Grabner, H., et al.; "*On-line Boosting and Vision*;" IEEE Conference of Computer Vision and Pattern Recognition; dated 2006; retrieved on Nov. 14, 2013 from <http://www.icg.tu-graz.ac.at/Members/hgrabner/pub_hgrabner/grabner2006OnlineBoosting.pdf/at_download/file>.
Grabner, H., et al.; "*Semi-Supervised On-line Boosting for Robust Tracking*;" Proceedings of the European Conference on Computer Vision; dated 2008; retrieved on Nov. 14, 2013 from <http://www.vision.ee.ethz.ch/~hegrabne/papers/Grabner2008Semi-supervisedOn-lineboosting.pdf>.
Grabner, M., et al.; "*Learning Feature for Tracking*;" IEEE Conference of Computer Vision and Pattern Recognition; dated 2007; retrieved on Nov. 14, 2013 from <http://www.icg.tugraz.at/publications/pdf/iptracking.pdf/at_download/file>.
Kalal, Z., et al.; "*Online learning of robust object detectors during unstable tracking*;" 3$^{rd}$ On-line Learning for Computer Vision Workshop; dated 2009; retrieved on Nov. 15, 2013 from <http://info.ee.surrey.ac.uk/Personal/Z.Kalal/Publications/2009_olcv.pdf>.
Kalal, Z., et al.; "*P-N Learning: Bootstrapping Binary Classifiers by Structural Constraints*;" 23$^{rd}$ IEEE Conference on Computer Vision and Pattern Recognition, CVPR; dated Jun. 2010; retrieved on Nov. 15, 2013 from <http://eprints.pascal-network.org/archive/00006951/01/cvpr2010.pdf>.
Kuhn, H. W.; "*The Hungarian Method for the Assignment Problem*;" Naval Research and Logistics Quarterly; Vo. 2; pp. 83-97; dated 1955; retrieved on Nov. 15, 2013 from <http://tom.host.cs.st-andrews.ac.uk/CS3052-CC/Practicals/Kuhn.pdf>.
Latecki, L., et al.; "*Object Tracking with Dynamic Template Update and Occlusion Detection*;" dated 2006; retrieved on Nov. 14, 2013 from <http://www.cis.temple.edu/~latecki/Papers/icpr06.pdr>.
Lepetit, V., et al.; "*Randomized Trees for Real-Time Keypoint Recognition*;" CVPR; dated 2005; retrieved on Nov. 14, 2013 from <http://www.wisdom.weizmann.ac.il/~vision/courses/2010_2/papers/lepetit-randomized-trees-cvpr05.pdf>.
Matthews, I., et al.; "*The Template Update Problem*;" IEEE Transactions of Pattern Analysis and Machine Intelligence, vol. 26; dated 2004; retrieved on Nov. 14, 2013 from <http://www.ri.cmu.edu/pub_files/pub4/matthews_iain_2004_1/matthews_iain_2004_1.pdf>.
Ozuysal, M., et al.; "*Feature Harvesting for Tracking-by-Detection*;" Proceedings of the European Conference on Computer Vision; dated 2006; retrieved on Nov. 14, 2013 from <http://windage.googlecode.com/svn/trunk/Mindmap/Tracking/Papers/%5B2006%5D%20Feature%20Harvesting%20for%20Tracking-by-Detection.pdf>.
Ross, D. A., et al.; "*Incremental Learning for Robust Visual Tracking*;" International Journal of Computer Vision, vol. 77; pp. 125-141; dated 2008; retrieved on Nov. 14, 2013 from <http://faculty.ucmerced.edu/mhyang/papers/ijcv08a.pdf>.
Rousseeuw, P. J.; "*Least Medium of Squares Regression*;" Journal of the American Statistical Associated, vol. 79, No. 388; pp. 871-880; dated Dec. 1984; retrieved on Nov. 15, 2013 from <http://web.ipac.caltech.edu/staff/fmasci/home/statistics_refs/LeastMedianOfSquares.pdf>.
Ta, D. N., et al.; "*SURFTrac: Efficient Tracking and Continuous Object Recognition using Local Feature Descriptors*;" dated 2009; retrieved on Nov. 14, 2013 from <http://research.nokia.com/files/wchen_cvpr09.pdf>.
Viola, P., et al.; "*Rapid Object Detection using a Boosted Cascade of Simple Features*;" Conference on Computer Vision and Pattern Recognition; dated 2001; retrieved on Nov. 15, 2013 from <http://www.cs.cmu.edu/~efros/courses/LBMV07/Papers/viola-cvpr-01.pdf>.
Yu, Q., et al.; "*Online Tracking and Reacquisition Using Co-trained Generative and Discriminative Trackers*;" Proceedings of the European Conference on Computer Vision; dated 2008; retrieved on Nov. 15, 2013 from <http://iris.usc.edu/people/thangdin/files/Thang_ECCV08.pdf>.

\* cited by examiner

METHOD, APPARATUS AND COMPUTER PROGRAM PRODUCT FOR PROVIDING OBJECT TRACKING USING TEMPLATE SWITCHING AND FEATURE ADAPTATION

CROSS-REFERENCE TO RELATED APPLICATIONS

This application claims the benefit of U.S. Provisional Application No. 61/357,315, filed Jun. 22, 2010, which is incorporated by reference herein in its entirety.

TECHNOLOGICAL FIELD

Embodiments of the present invention relate generally to computer vision and, more particularly, relate to an apparatus, method and computer program product for enabling object tracking using on-line template switching and feature adaptation.

BACKGROUND

Electronic computing devices are becoming increasingly ubiquitous in the modern world. Whether utilized for business, entertainment, communication, security or numerous other purposes, the capabilities of such devices continue to expand. Along with the improvements made in terms of processing power, rendering technology, memory, power consumption and other aspects, various applications have also been developed to utilize the expanded capabilities of computing devices. However, the expansion of capabilities with respect to such devices has also introduced new sets of challenges as further improvements are sought and new applications are developed.

One area in which the use of electronic computing devices has presented new challenges relates to computer vision. Computer vision utilizes machines to see. As such, for example, computer vision often employs cameras and other elements to build systems that can obtain information from image data such as a video sequence, views from multiple cameras or multidimensional data from scanning devices. Computer vision may be useful for many tasks such as: controlling processes or device movements; detecting and/or recognizing events, objects, patterns or people; organizing information; and/or the like. Accordingly, computer vision may be considered to be an artificial vision system, which may be implemented in combinations of various devices and applications.

The tracking of objects and/or regions of interest within a series of video frames has been a longstanding problem in computer vision scenarios. In particular, it has been difficult to provide robust tracking capabilities for objects or regions of interest that may undergo significant changes (e.g., illumination changes, pose or aspect changes, occlusions, and/or the like). Image-patch based and feature-based methods of object tracking have been proposed in the past. Image-patch based tracking has been considered by some to be suitable for tracking rigid and non-rigid objects that may undergo significant pose changes. However, traditional image-patch based methods have tended to suffer from a drifting template problem (e.g., accumulated error in template updating leading to a tracking failure) and may be sensitive to partial occlusion. Feature-based methods have been considered by some to be insensitive to partial occlusion, but have traditionally proven to be less useful for tracking objects that undergo large pose changes. Accordingly, improvements in the area of object tracking may be desirable.

BRIEF SUMMARY OF EXAMPLE EMBODIMENTS

A method, apparatus and computer program product are therefore provided that may enable devices to provide improved object tracking. In particular, some embodiments of the present invention may provide for improved visual tracking for use in connection with, for example, computer vision, multimedia content analysis and retrieval, augmented reality, human computer interaction and region-based image processing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3, which includes

DETAILED DESCRIPTION

Figure 1:
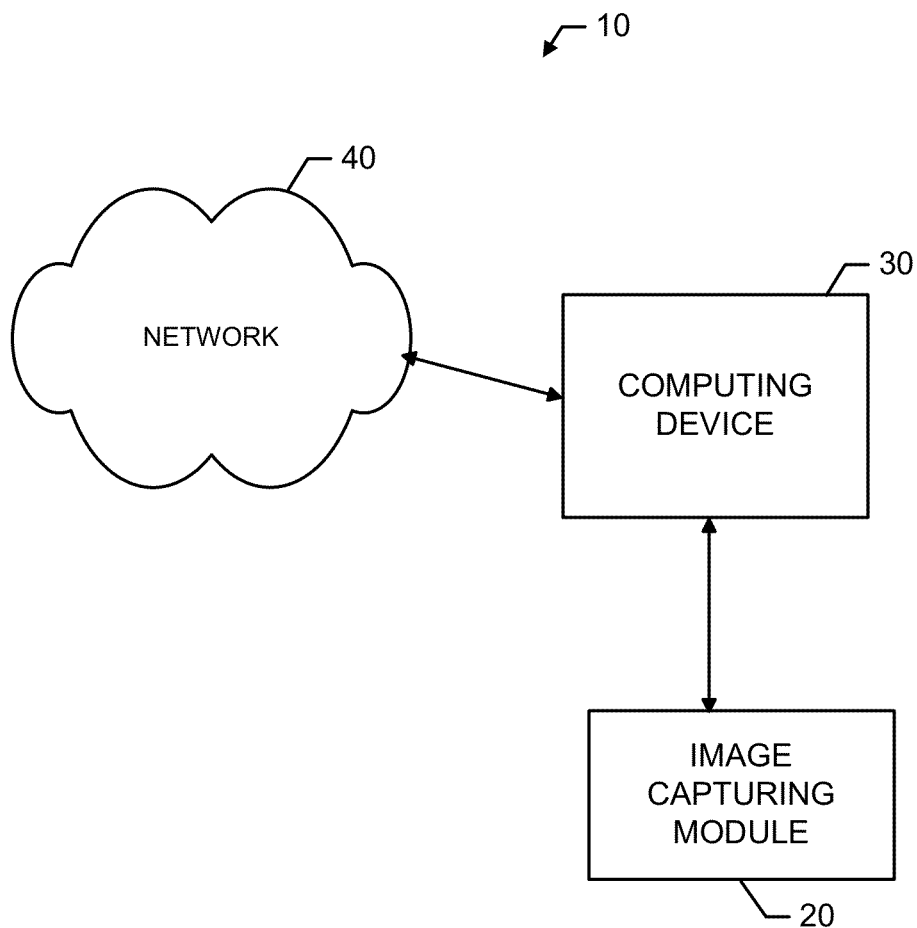
FIG. 1 is a schematic block diagram of a computer vision system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments may provide a robust feature-based approach that may be extended to non-rigid objects and objects undergoing significant pose changes. In some embodiments, representative object appearances may be stored as candidate templates during tracking and a particular template (e.g., a best template) for matching a following frame may be selected. Templates may be added and switched during the tracking process in order to keep updated relationships between the object being tracked and the templates employed for tracking. Accordingly, example embodiments may be resilient to misaligned templates and may alleviate the drifting problem.

Example embodiments may be applied to the capabilities of any computer or computing device including either fixed or mobile platforms. Thus, for example, mobile terminals that include image capturing devices (e.g., camera phones) and other mobile devices may be used to track human faces for use in human-device interactions, to track objects (e.g., for augmented reality scenarios in which objects are tracked and computer graphics are superimposed over the tracked objects), low-level image processing, and/or the like. Example embodiments may, however, also be used in connection with network (e.g., Internet) provided services (e.g., content sharing or management services). In this regard, for example, by automatically analyzing and tracking objects of interest in uploaded video, services may be enabled to provide impressive user experiences by searching for and sharing content that includes objects of interest. Thus, for example, a service may be provided to automatically detect, track and inform the user of other video clips that include an object that the user has defined to be of interest.

As discussed above, embodiments of the present invention may be practiced in the context of a computer vision system. As such, an example embodiment will now be described in reference to FIG. 1, which illustrates a basic block diagram of a system for employing a computer vision system. However, it should be appreciated that embodiments of the present invention could be practiced in numerous other environments and are not limited to application in connection with computer vision systems. Moreover, even in connection with computer vision systems, it should be recognized that FIG. 1 is merely one basic example of such a system and should not be seen as limiting in any way.

Referring now to FIG. 1, a computer vision system 10 may include an image capturing module 20 and a computing device 30. The image capturing module 20 may include one or more cameras or other image capturing sensors configured to capture image data. The image data may be in the form of, for example, a video sequence or one or more images from one or more respective cameras or sensors. The computing device 30 may be a computer (e.g., a personal computer, laptop, server, or the like), a mobile telephone, global positioning system (GPS) device, a personal digital assistant (PDA), pager, mobile television, gaming device, camera, audio/video player, radio, or any combination of the aforementioned, and other types of electronic devices that may include a processor and/or memory for executing various hardware and/or software processes. The computing device 30 may be configured to employ processing in accordance with embodiments of the present invention as described in greater detail below in connection with the description of FIG. 2.

Communication between the image capturing module 20 and the computing device 30 may be real-time or near real-time via either wired or wireless transmission mechanisms. In some cases, the communication between the image capturing module 20 and the computing device 30 may be intermittent or delayed. Furthermore, in some situations, the image capturing module 20 may store image data, which may then be communicated to the computing device 30 at a later time (directly or via an intermediate device).

In some embodiments, the image capturing module 20 and the computing device 30 may be portions of a single device (e.g., a mobile terminal or phone with a built in camera). In some cases, the computing device 30 may be in communication with other devices via a network 40, although no network connection is required. Moreover, in some cases, the computing device 30 may be in communication with the image capturing module 20 via the network 40. For example, in some situations, the image capturing module 20 may be a portion of a camera, vision system or even a mobile device that provides image data to a service platform via the network 40. As such, the service platform (which may be a computer or a portion of a server or server bank) may be embodied as the computing device 30, which may host an instance of an apparatus for enabling object tracking using template switching and feature adaptation.

The network 40 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 40. One or more communication nodes (e.g., the computing device 30) such as mobile terminals or fixed computer terminals may be in communication with each other via the network 40 and each may include an antenna or antennas for transmitting signals to and for receiving signals from a base site (e.g., an access point), which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the communication nodes. In some embodiments, the network 40 may employ one or more mobile access mechanisms such as wideband code division multiple access (W-CDMA), CDMA2000, global system for mobile communications (GSM), general packet radio service (GPRS), long term evolution (LTE) and/or the like may be supported.

Figure 2:
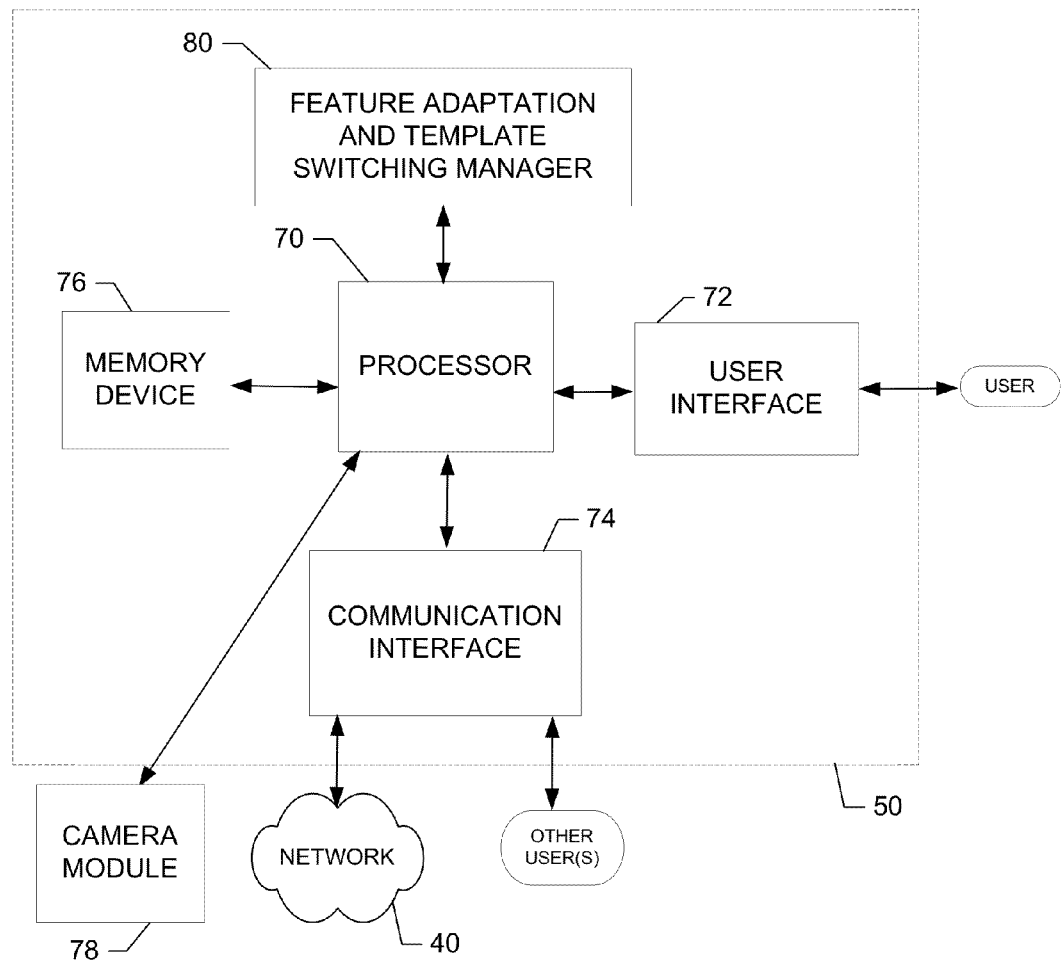
FIG. 2 is a schematic block diagram of an apparatus for providing object tracking using template switching and feature adaptation according to an example embodiment of the present invention.

Referring now to FIG. 2, a schematic block diagram of an apparatus 50 for providing object tracking using on-line template switching and feature adaptation according to an example embodiment of the present invention is provided. The apparatus 50 may include or otherwise be in communication with a processor 70, a user interface 72, a communication interface 74 and a memory device 76. However, the apparatus 50 may further include additional elements as described in greater detail below. In this regard, it should be understood that the example embodiment of FIG. 2 is provided merely for example purposes and thus other configurations for the apparatus 50 are also possible. Moreover, certain elements shown in FIG. 2 may be split between multiple devices (e.g., operating in a client/server relationship) or may all be embodied at the same device.

The memory device 76 may include, for example, one or more volatile and/or non-volatile memories. In other words, for example, the memory device 76 may be an electronic storage device (e.g., a computer readable storage medium) comprising gates or other structures defining memory cells configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or a network device) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus 50 is embodied in a server or some other network devices, the user interface 72 may be limited, remotely located or eliminated. However, in an embodiment in which the apparatus 50 is embodied in a communication device (e.g., a mobile terminal), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In some embodiments, the apparatus 50 may include or be in communication with a media capturing module (e.g., the image capturing module 20), such as a camera, video and/or audio module, in communication with the controller 20. The media capturing module may be any means for capturing an image, video and/or audio for storage, display or transmission. For example, in an example embodiment in which the media capturing module is a camera module 78, the camera module 78 may include a digital camera capable of forming a digital image file from a captured image or forming a video content file from a sequence of image frames. As such, the camera module 78 may include all hardware, such as a lens or other optical device, and software necessary for creating a digital image file from a captured image. Alternatively, the camera module 78 may include only the hardware needed to view an image, while a memory device of the apparatus 50 stores instructions for execution by the processor 70 in the form of software necessary to create a digital image file from a captured image. In an example embodiment, the camera module 78 may further include a processing device such as a co-processor which assists the processor 70 in processing image data and an encoder and/or decoder for compressing and/or decompressing image data. The encoder and/or decoder may encode and/or decode according to a JPEG standard format or other formats.

In an exemplary embodiment, the processor 70 may be embodied as, include or otherwise control a feature adaptation and template switching manager 80. As such, in some embodiments, the processor 70 may be said to cause, direct or control the execution or occurrence of the various functions attributed to the feature adaptation and template switching manager 80 as described herein. The feature adaptation and template switching manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the feature adaptation and template switching manager 80 as described herein. Thus, in examples in which software is employed, a device or circuitry (e.g., the processor 70 in one example) executing the software forms the structure associated with such means.

The feature adaptation and template switching manager 80 may be configured to perform feature adaptation as described herein and also perform template switching to improve object tracking performance. As such, the feature adaptation and template switching manager 80 may be configured to cause the storing of representative object appearances as candidate templates during tracking. The feature adaptation and template switching manager 80 may be further configured to select a template from among the candidate templates in order to employ the selected template as a "best template" to match in following frames. As such, the feature adaptation and template switching manager 80 may manage the on-line adding and switching of templates in order to keep updated as to new object appearances.

The feature adaptation and template switching manager 80 may provide a relatively simple mechanism by which to perform object tracking for a template initialized to a first video frame to enable tracking of a template object in subsequent frames, even over a relatively long period of time, if desired. Moreover, the feature adaptation and template switching manager 80 may be configured to provide relatively robust object tracking in the presence of significant variations such as pose changes, illumination changes, deformation, occlusion, and/or the like. To accomplish robust tracking, the feature adaptation and template switching manager 80 may be configured to enable updating of the initial template such that new object appearances may be properly incorporated into matching operations. According to an example embodiment, representative object appearances may be stored during tracking so that the representative object appearances may be used as candidate templates for image matching in following frames. As such, feature-based image registration methods may be employed to match candidate templates against an image region in question. Fast Haar-like features may be used to track key points and enablement may be provided for carrying out multiple template matching operations for every frame while still achieving real time tracking speed. A template that provides a highest or best matching score may be selected to determine the position of a target object. As such, the feature adaptation and template switching manager 80 may be used to control template adding and switching to keep the feature adaptation and template switching manager 80 updated with respect to new object appearances due to deformations, pose changes, etc. The feature adaptation and template switching manager 80 may also be resilient to misaligned templates and therefore alleviate the drifting problems that may occur in traditional mechanisms.

Haar-like feature-based image matching may be employed by the feature adaptation and template switching manager 80 according to some embodiments due to its relatively fast computation in object detection and image matching operations. An example of holistic Haar-like feature matching that may be employed by the feature adaptation and template switching manager 80 is described in U.S. Patent Application Publication No. 2007/0009159, which is incorporated herein by reference in its entirety. In an example embodiment, the feature adaptation and template switching manager 80 may be configured to utilize Haar-like features extracted from a grid of a predetermined size centered at a key point. Haar-like feature components may be computed for each sample point, where each component represents a difference of intensities between adjacent blocks that align in different directions (e.g., horizontal, vertical and left/right diagonal directions). Each key point may therefore lead to a multidimensional Haar-like feature vector to provide a simple mechanism by which to provide discrimination power for key point tracking. Each key point may include an X-Y image pixel position around which Haar-like features are extracted. A template T $\{(h_1,p_1), (h_2,p_2), \ldots, (h_N,p_N)\}$ may therefore be represented as a set of Haar-like features h and accompanying position vectors $p=(x,y)^T$.

An optimal correspondence between two sets of feature points may be formulated as a linear assignment problem for which elements of a weighted adjacent matrix may be given by the Euclidean distances between two Haar-like feature vectors $\|h_1-h_1'\|$. In some embodiments, a determination may be made by the feature adaptation and template switching manager 80 as to the column-wise and row-wise minimum elements in the adjacent matrix.

Accordingly, the feature adaptation and template switching manager 80 may be configured to employ a best-best-match strategy, which is illustrated in Algorithm 1 below, to reduce the computational cost of evaluating the adjacent matrix. The cost saving may be realized since it is not necessary to sum up all elements of the feature vector distances, if the distance already exceeds a minimal-distance-thus-far along the row or the column in question. If an input image is similar to a particular template, the number of the best-best-match points with respect to the total number of feature points can be expected to be relatively high (e.g. >0.5). This ratio may therefore be used to evaluate the tracking quality.

---

Algorithm 1 Best-Best-Match

---

- Input: Two set of Haar-like feature vectors $\{h_1, h_2, \ldots, h_M\}$ and $\{h'_1, h'_2, \ldots, h'_N\}$.
- Output: the best-best-match correspondences e.g. $\{\{h_1, h'_3\}, (h_S, h'_{13}\}, \ldots \}$.

```
for  i = 1 to M; and j = 1 to N;
        e = 0.0; early_stop= FALSE;
        for d = 1 to 36;  // uterate for 36 components of h vectors
            e = e + (h[i] [d] − h' [j] [d] * (h[i] [d] − h' [j] [d]);
            if (e > min_col [i] or e > min_row [j])
                early_stop=TRUE;   break;   // the reason of cost saving.
        end
        if ( early_stop= =FALSE )
            if ( e < min_col[i] )
                min_col [i]=e;         min_col_index [i] = j;
            ( e < min_row [j] )
                min_row [j] = e;        min_row_index [j] = I;
        end
end
for i = 1 to M;
    if ( min_row_index [ min_col_index [i] ] = = i )
        a best-best-match (h[i], h'[min_row_index [i]]) is found;
end
```

---

Given the correspondence between template key points $\{p_1, \ldots, p_K\}$ and input image key points $\{p_1', \ldots, p_K'\}$, the goal of geometric model fitting and outlier removal may be to derive a geometric transformation of the template to minimize the median of reprojection errors as indicated by equation (1)

$$\mu^* = \underset{\mu}{\arg\min} \operatorname{median}(e_i) \quad (1)$$

in which $\mu=(s,\theta,t)$ is the parameter of the similarity transformation $$S_\mu(p) = s \begin{bmatrix} \cos(\theta) & -\sin(\theta) \\ \sin(\theta) & \cos(\theta) \end{bmatrix} p + t \text{ and } \|S_\mu(p_i) - p_i'\|$$

are reprojection errors.

The Least Median of Squares (LMS) estimation in equation (1) is robust with respect to outliers and has about a 50% breakdown point. However, LMS algorithms that achieve high breakdown points may often be computationally demanding. Accordingly, an iterative procedure may be adopted in order to estimate a solution. Inlier correspondences with reprojection errors below the median error may be used to estimate a new transformation parameter $\mu$. As such, $\mu$ and inlier correspondences may be iteratively re-estimated until further improvements are not achievable (or not significant) in a predetermined number (e.g., 10) of consecutive iterations. An optimal transformation $S_{\mu^*}(.)$ may then be applied to a template bounding box. The above described re-estimation may essentially perform a hill-climbing in the transformation space, and converges to a local minimum relatively rapidly as long as the target object remains at least partially visible.

In an example embodiment, the feature adaptation and template switching manager 80 may employ a tracking algorithm that examines each new video frame in which an object is being tracked by initially cropping, rotating and resizing a tracked image region of the input frame as appropriate in order to produce a fixed size input image patch. The image patch may then be matched against candidate templates of the same size using feature-based image registration as described above. An optimal geometric transformation may then be applied to the tracked image region in the next frame. Accordingly, the feature adaptation and template switching manager 80 may employ a tracking method that adapts to image variation by enabling Haar-like feature adaptation and template switching and also providing for selection of stable features during tracking.

During the employment of the tracking algorithm by the feature adaptation and template switching manager 80, tracking quality may be evaluated by monitoring of various parameters that may be indicative of imaging matching quality. Parameters monitored may include a ratio (r) of the number of best-best-match points over the total number of template key points. The value of the ratio (r) may be a relatively robust indicator of tracking quality. Another parameter that may be monitored may include the average Euclidian distances (f) between best-best-matched Haar-like feature vectors, which may quantify a texture difference between two images. Another parameter, the median of the reprojection error (d) during the geometric fitting, may capture the structural variation between two images.

When tracking quality is deemed to be good (e.g., when r is greater than about 0.45 in some examples), Haar-like feature vectors may be adapted to small image changes. The adaptation may be achieved by replacing the Haar-like feature vectors of those matched template key points with corresponding Haar-like feature vectors extracted from the input image. This adaptation may be useful in maintaining high quality tracking even if template switching is not performed. However, feature-level adaptation may only be temporal in some cases and thus the original feature vectors may be retained when a template is switched off. Additionally, positions of key points may remain unchanged so that the geometrical structure of the template object may be maintained.

When significant changes occur (e.g., changes in pose, lighting, occlusion conditions, etc.), feature adaptation may not be sufficient to provide quality tracking (e.g., when r drops below 0.45 in some cases). According to some examples, template switching may be performed to further improve object tracking under these conditions. When tracking quality drops or other indications of a significant change are present, the current input image may be defined as a "new-template-to-be" and may be added as a new template. By automatically adding new templates, the feature adaptation and template switching manager 80 may be configured to update itself for tracking when relatively large image variations are experienced.

In each new frame, the feature adaptation and template switching manager 80 may be configured to test an input image region or tracking region against at least two templates including an active template and at least one inactive template (e.g., a selected inactive template). The active template may be a template that has been switched on based at least upon the previous frame. The selected inactive template may be one of a plurality of inactive templates that are stored (e.g., in the memory device 76) for comparison to new frames to improve updating performance of the feature adaptation and template switching manager 80. In an example embodiment, the selected inactive template may be selected from the plurality of inactive templates based on a quality measure (e.g., its accumulated r values). For example, candidate templates (including inactive templates) may have r values or some other quality measure related values accumulated and such values may be stored in association with each respective candidate template. The candidate templates may be ranked based on the quality measure (e.g., the accumulated r values) and the top ranked template may be identified as a "most stable template". Inactive templates with low quality measures (e.g., low accumulated r values) may not be used for tracking as they are typically misaligned or otherwise spurious with respect to the current image.

In an example embodiment, the feature adaptation and template switching manager 80 may be configured to compare the new frame to both the active template and the selected inactive template. If the selected inactive template matches the new frame better than the active template, the selected inactive template may be switched on and may become the active template for the next frame. There may only be one active template at any given time. In some cases, whenever a template is switched on and used for tracking, the corresponding r values for the template may be stored and accumulated for the purposes of ranking described above.

In some embodiments, the most stable template may be used to verify the new-template-to-be and to correct misalignments. The verification may include putative matching and geometrical fitting between the most stable template and the new-template-to-be. In some cases, the verification may be accepted if values of r, f and d have specific values or meet certain criteria (e.g., not exceeding certain thresholds). Accordingly, the feature adaptation and template switching manager 80 may provide a geometrical correction, which in conjunction with template switching, may provide a resiliency to misaligned templates and alleviate the drifting problem.

Because of noise or background clutter, template features may not always be good for tracking. While learning based methods can be used to distinguish between an object and background features, some embodiments may regard geometrically verified inlier features as reliable features for tracking. As such, in some examples, a simple count may be conducted as to how many times (c) a feature point has been positively verified in a geometrical fitting operation.

During tracking, features with a high count (c) may be favored in matching operations by adding a biased term to adjacent matrix elements as shown in equation (2)

$$\|h_i - h_j'\| + \beta \exp(-c(i)/\bar{c}) \qquad (2)$$

in which $\|h_i - h_j'\|$ is the Euclidian distance between Haar-like features, $\beta$ is a user specified parameter, $c(i)$ is a corresponding stable feature count, and $\bar{c}$ is the mean of all template feature counts. By using such a matching strategy, the tracking robustness of the feature adaptation and template switching manager 80 may be improved.

In an example embodiment, despite efforts toward feature adaption and template switching, tracking may still be difficult for complete object occlusion or rapid camera or object motion. In such cases, a full search object detection process may be invoked to assist with re-initialization of tracking. In some cases, the full search object detection process may include at least three operations including, for a new input video frame, extracting Haar-like feature vectors from mesh points of a lattice placed on the entire image frame. A template may then scan throughout the entire frame (e.g., at an interval that matches the interval between mesh points). Each template Haar-like feature vector may then be compared against Haar-like features vectors extracted from the closest mesh points in the image frame. For each vector component, one vote may be counted if the difference between template and image features is smaller than a given threshold. A position having the highest vote, that is, $v_{max}$, may be detected, and all positions with at least a predetermined ratio of $v_{max}$ (e.g., $0.95 * v_{max}$) may also be detected. Among all detected positions, the position that is nearest to the previous tracking position may be used to initialize the tracker.

Some embodiments of the present invention may therefore provide for a relatively high tracking robustness. The tracking robustness, which may be indicated by the number of frames after which the tracking no longer recovers from failures, may be relatively high for various conditions including illumination changes, pose changes, partial occlusion, and/or the like. Moreover, re-initialization may be conducted in situations in which tracking is lost, for some reason. As such, using the stable feature matching strategy described above in connection with equation (2) along with the providing for correction of drifting templates by adding and switching to better aligned templates, some example embodiments of the present invention may provide good accuracy for object tracking over a large variety of conditions and with reasonable amounts of computational complexity. The computational cost of providing such tracking may be proportional to the number of feature points being tracked, but for most applications, near real-time tracking may be implemented.

Figure 3A:
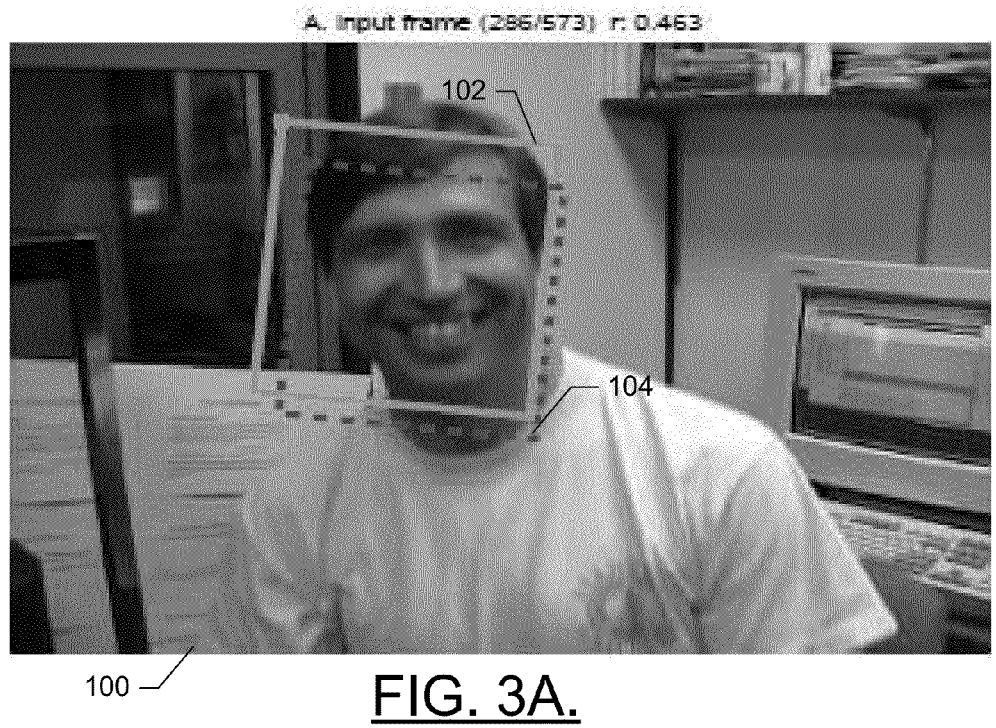
FIGS. 3A, 3B and 3C illustrates operation of one example embodiment of the present invention.
Figure 3B:
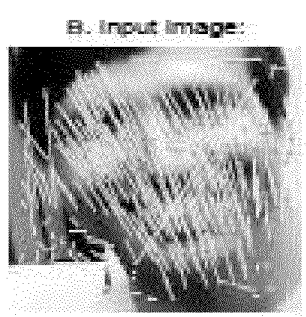
Figure 3C:
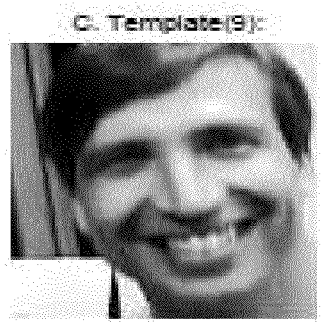

FIG. 3, which includes FIGS. 3A, 3B and 3C illustrates operation of one example embodiment. An input image frame 100 may be provided for analysis as indicated at FIG. 3A. Solid box 102 may denote a tracking result for this frame, which may correspond to the object being tracked (e.g., the face of the individual). Meanwhile, dashed box 104 may denote the tracking result from the previous frame. A portion of the image corresponding to the tracking result from the previous frame may be cropped, rotated and resized into the image shown in FIG. 3B. The portion of the image corresponding to the tracking result from the previous frame may then be matched with an active template image, which is shown in FIG. 3C. Line segments shown in FIG. 3B may represent putative matching outputs. Outlier correspondences (e.g., in background clutter) may be rejected by geometrical fitting.

Accordingly, using example embodiments of the present invention, in contrast to image patch based tracking, feature-based matching methods may be implemented to provide robust tracking even for partially occluded objects. As such, feature-based tracking may be applied to track non-planar objects by switching between a set of templates in order to handle pose changes or other factors that impact the object being tracked.

Figure 4:
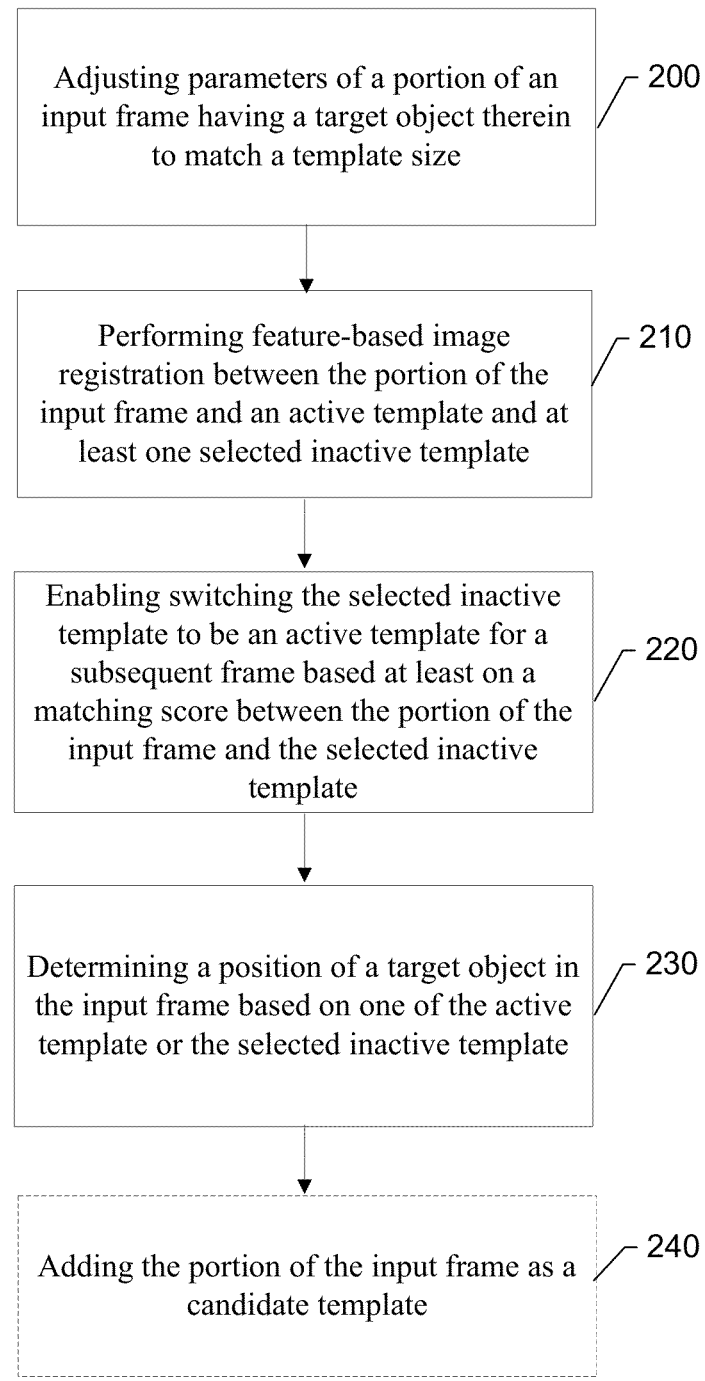
FIG. 4 is a flowchart according to a method of providing object tracking using template switching and feature adaptation according to an example embodiment of the present invention.

FIG. 4 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for enabling object tracking using template switching and feature adaptation, as shown in FIG. 4, includes adjusting parameters of a portion of an input frame having a target object therein to match a template size at operation 200. The method may further include performing feature-based image registration between the portion of the input frame and an active template and at least one selected inactive template at operation 210. The method may further include enabling switching the selected inactive template to be an active template for a subsequent frame based at least on a matching score between the portion of the input frame and the selected inactive template at operation 220 and determining a position of a target object in the input frame based on one of the active template or the selected inactive template at operation 230.

In some embodiments, certain ones of the operations above may be modified or further amplified as described below. Furthermore, in some embodiments, additional optional operations may be included, an example of which is shown in dashed lines in FIG. 4. Modifications, additions or amplifications to the operations above may be performed in any order and in any combination. In this regard, for example, the method may further include adding the portion of the input frame as a candidate template at operation 240. In an example embodiment, determining the position of the target object may include determining the position using the one of the active template or the selected inactive template that provides a matching score more indicative of a match with the portion of the input frame. In some embodiments, adjusting parameters of the portion of the input frame may include cropping, rotating and resizing the portion of the input frame. In an example embodiment, the selected inactive template may be a highest ranked inactive template of a plurality of candidate templates scored with respect to a ratio of a number of best-best-match points to a total number of template key points. In some cases, the ratio may be stored and accumulated for each candidate template.

In an example embodiment, an apparatus for performing the method of FIG. 4 above may comprise a processor (e.g., the processor 70) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the processor 70, the feature adaptation and template switching manager 80, and/or a device or circuit for executing instructions or executing an algorithm for processing information as described above.

Figure 5:
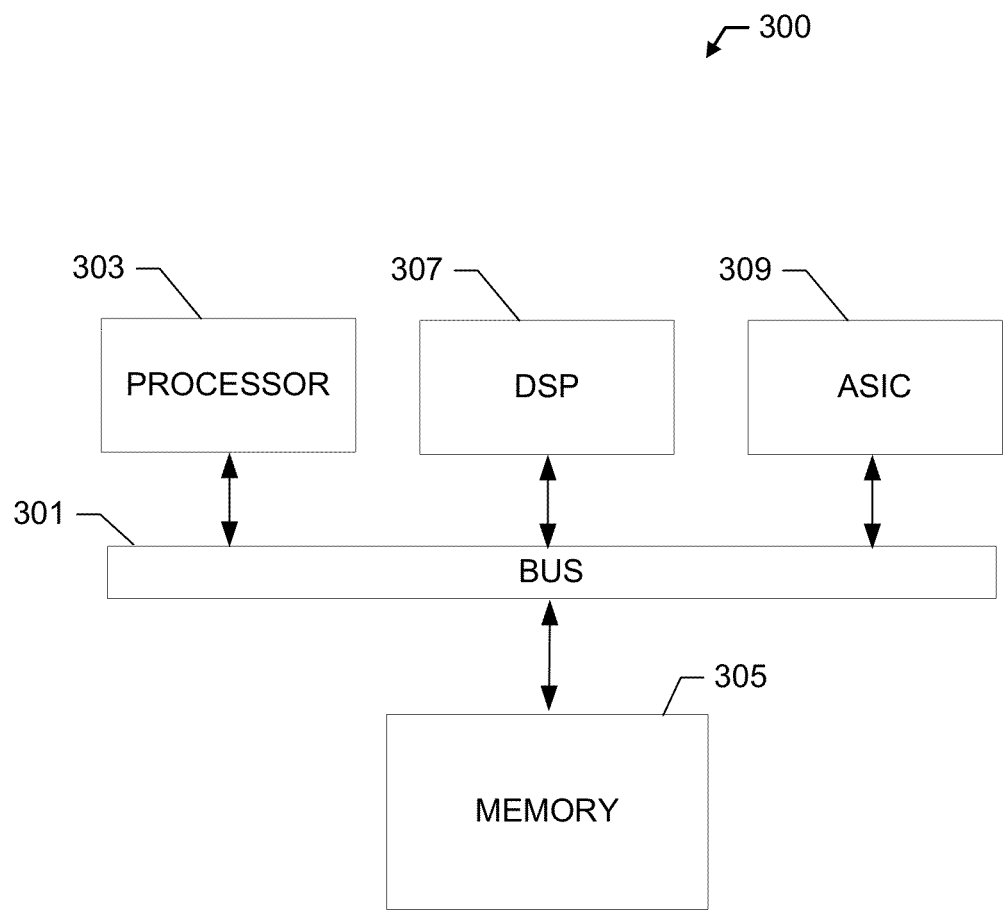
FIG. 5 illustrates a chip set or chip upon which an example embodiment of the present invention may be implemented.

In some cases, example embodiments may be implemented on a chip or chip set. FIG. 5 illustrates a chip set or chip 300 upon which an embodiment of the invention may be implemented. Chip set 300 is programmed to track objects as described herein and includes, for instance, the processor and memory components described with respect to FIG. 2 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 300 can be implemented in a single chip. It is further contemplated that in certain embodiments the chip set or chip 300 can be implemented as a single "system on a chip." It is further contemplated that in certain embodiments a separate ASIC would not be used, for example, and that all relevant functions as disclosed herein would be performed by a processor or processors. Chip set or chip 300, or a portion thereof, constitutes a means for performing one or more steps of object tracking services. Chip set or chip 300, or a portion thereof, constitutes a means for performing one or more steps of tracking objects.

In one embodiment, the chip set or chip 300 includes a communication mechanism such as a bus 301 for passing information among the components of the chip set 300. A processor 303 has connectivity to the bus 301 to execute instructions and process information stored in, for example, a memory 305. The processor 303 may include one or more processing cores with each core configured to perform independently. A multi-core processor enables multiprocessing within a single physical package. Examples of a multi-core processor include two, four, eight, or greater numbers of processing cores. Alternatively or in addition, the processor 303 may include one or more microprocessors configured in tandem via the bus 301 to enable independent execution of instructions, pipelining, and multithreading. The processor 303 may also be accompanied with one or more specialized components to perform certain processing functions and tasks such as one or more digital signal processors (DSP) 307, or one or more application-specific integrated circuits (ASIC) 309. A DSP 307 typically is configured to process real-world signals (e.g., sound, video) in real time independently of the processor 303. Similarly, an ASIC 309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 300 includes merely one or more processors and some software and/or firmware supporting and/or relating to and/or for the one or more processors.

The processor 303 and accompanying components have connectivity to the memory 305 via the bus 301. The memory 305 includes both dynamic memory (e.g., RAM, magnetic disk, writable optical disk, etc.) and static memory (e.g., ROM, CD-ROM, etc.) for storing executable instructions that when executed perform the inventive steps described herein to register identifiers with accounts. The memory 305 also stores the data associated with or generated by the execution of the inventive steps.

In some cases, the operations (200-240) described above, along with any of the modifications may be implemented in a method that involves facilitating access to at least one interface to allow access to at least one service via at least one network. In such cases, the at least one service may be to perform at least operations 200-240.

An example of an apparatus according to an example embodiment may include at least one processor and at least one memory including computer program code. The at least one memory and the computer program code may be configured to, with the at least one processor, cause the apparatus to perform the operations 200-240 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-240 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
adjusting parameters of a portion of an input frame having a target object therein to match a template size;
performing, via a processor, feature-based image registration between the portion of the input frame and an active template and at least one selected inactive template;
enabling switching the selected inactive template to be an active template for a subsequent frame based at least on a matching score between the portion of the input frame and the selected inactive template; and
determining a position of a target object in the input frame based on one of the active template or the selected inactive template,
wherein the selected inactive template comprises a highest ranked inactive template of a plurality of candidate templates scored with respect to a ratio of a number of best-best-match points to a total number of template key points.

2. A method according to claim 1 further comprising adding the portion of the input frame as a candidate template.

3. A method according to claim 1 wherein determining the position of the target object comprises determining the position using one of the active template or the selected inactive template that provides a matching score more indicative of a match with the portion of the input frame.

4. A method according to claim 1 wherein adjusting parameters of the portion of the input frame comprises cropping, rotating and resizing the portion of the input frame.

5. A method according to claim 1 further comprising accumulating the ratio for each candidate template.

6. An apparatus comprising at least one processor and at least one memory storing computer program code, wherein the at least one memory and stored computer program code are configured, with the at least one processor, to cause the apparatus to at least:
adjust parameters of a portion of an input frame having a target object therein to match a template size;
perform feature-based image registration between the portion of the input frame and an active template and at least one selected inactive template;
enable switching the selected inactive template to be an active template for a subsequent frame based at least on a matching score between the portion of the input frame and the selected inactive template; and
determine a position of a target object in the input frame based on one of the active template or the selected inactive template,
wherein the selected inactive template comprises a highest ranked inactive template of a plurality of candidate templates scored with respect to a ratio of a number of best-best-match points to a total number of template key points.

7. An apparatus according to claim 6 wherein the at least one memory and stored computer program code are further configured, with the at least one processor, to cause the apparatus to add the portion of the input frame as a candidate template.

8. An apparatus according to claim 6 wherein the at least one memory and stored computer program code are configured, with the at least one processor, to cause the apparatus to determine the position of the target object by determining the position using one of the active template or the selected inactive template that provides a matching score more indicative of a match with the portion of the input frame.

9. An apparatus according to claim 6 wherein the at least one memory and stored computer program code are configured, with the at least one processor, to cause the apparatus to adjust parameters of the portion of the input frame by cropping, rotating and resizing the portion of the input frame.

10. An apparatus according to claim 6 wherein the at least one memory and stored computer program code are further configured, with the at least one processor, to cause the apparatus to accumulate the ratio for each candidate template.

11. The apparatus of claim 6 wherein the apparatus comprises or is embodied on a mobile terminal.

12. The apparatus of claim 11 wherein the mobile terminal also comprises a user interface and user interface circuitry configured to control at least some functions of the user interface.

13. A computer program product comprising at least one non-transitory computer-readable storage medium having computer-readable program instructions stored therein, the computer-readable program instructions, when executed by a processor, configured to cause an apparatus to perform:
adjusting parameters of a portion of an input frame having a target object therein to match a template size;
conducting feature-based image registration between the portion of the input frame and an active template and at least one selected inactive template;
enabling switching the selected inactive template to be an active template for a subsequent frame based at least on a matching score between the portion of the input frame and the selected inactive template; and
determining a position of a target object in the input frame based on one of the active template or the selected inactive template,
wherein the selected inactive template comprises a highest ranked inactive template of a plurality of candidate templates scored with respect to a ratio of a number of best-best-match points to a total number of template key points.

14. A computer program product according to claim 13 further comprising program instructions configured to add the portion of the input frame as a candidate template.

15. A computer program product according to claim 13 wherein the program instructions configured to determine the position of the target object comprise program instructions configured to determine the position using one of the active template or the selected inactive template that provides a matching score more indicative of a match with the portion of the input frame.

16. A computer program product according to claim 13 wherein the program instructions configured to adjust parameters of the portion of the input frame comprise program instructions configured to crop, rotate and resize the portion of the input frame.

17. A computer program product according to claim 13 further comprising the program instructions configured to accumulate the ratio for each candidate template.

* * * * *